United States Patent
Szubbocsev

(10) Patent No.: US 11,438,171 B2
(45) Date of Patent: Sep. 6, 2022

(54) VIRTUALIZED AUTHENTICATION DEVICE

(71) Applicant: Micron Technology, inc., Boise, ID (US)

(72) Inventor: Zoltan Szubbocsev, Santa Clara, CA (US)

(73) Assignee: Micron Technology, Inc., Boise, ID (US)

( * ) Notice: Subject to any disclaimer, the term of this patent is extended or adjusted under 35 U.S.C. 154(b) by 232 days.

(21) Appl. No.: 16/810,507

(22) Filed: Mar. 5, 2020

(65) Prior Publication Data

US 2021/0281420 A1     Sep. 9, 2021

(51) Int. Cl.
*H04L 9/32* (2006.01)
*G06F 9/455* (2018.01)

(52) U.S. Cl.
CPC ........ *H04L 9/3247* (2013.01); *G06F 9/45558* (2013.01); *G06F 2009/45583* (2013.01)

(58) Field of Classification Search
CPC ... H04L 9/3247; H04L 9/0833; H04L 9/3236; H04L 63/10; H04L 63/126; H04L 9/0861; H04L 9/0825; H04L 9/0894; H04L 9/3226; G06F 9/45558; G06F 2009/45583; G06F 21/6218; G06F 2009/45587

See application file for complete search history.

(56) References Cited

U.S. PATENT DOCUMENTS

| | | | | |
|---|---|---|---|---|
| 9,147,086 B1* | 9/2015 | Potlapally | ........... | G06F 21/64 |
| 9,626,512 B1* | 4/2017 | Brandwine | ........... | G06F 21/57 |
| 2006/0236127 A1* | 10/2006 | Kurien | ........... | G06F 9/5077 |
| | | | | 713/193 |
| 2007/0016801 A1* | 1/2007 | Bade | ........... | G06F 21/57 |
| | | | | 713/193 |
| 2011/0154023 A1* | 6/2011 | Smith | ........... | G06F 21/74 |
| | | | | 713/155 |
| 2016/0149877 A1* | 5/2016 | Kancharla | ........... | H04L 9/3234 |
| | | | | 713/171 |
| 2016/0267105 A1* | 9/2016 | Sun | ........... | G06F 16/128 |
| 2017/0171164 A1* | 6/2017 | Alexander | ........... | H04L 9/3268 |
| 2018/0268146 A1* | 9/2018 | Suryanarayana | ........... | G06F 21/33 |
| 2018/0330081 A1* | 11/2018 | Hua | ........... | G06F 12/1441 |
| 2019/0228145 A1* | 7/2019 | Shanbhogue | ........... | G06F 21/79 |
| 2021/0240363 A1* | 8/2021 | Tumblin | ........... | G06F 3/0622 |

* cited by examiner

*Primary Examiner* — Matthew Smithers
(74) *Attorney, Agent, or Firm* — Holland & Hart LLP

(57) ABSTRACT

Methods, systems, and devices for virtualized authentication device are described. A virtual device (such as a virtual machine) may be permitted to access secured data within a memory device by an authentication process. The memory device may generate cryptographic keys in portions of the memory device and assign the cryptographic keys to the virtual machines. The virtual machine may use an authentication process using the cryptographic keys to access the secure data in the memory device. The authentication process may include authenticating the identity of the virtual machine and the code operating on the virtual machine based upon comparing cryptographic keys received from the virtual machines to the assigned cryptographic keys in the partitions of the memory device. Once both the identity of the virtual machine is authenticated, the virtual machine may be permitted to access the secure data in the memory device.

20 Claims, 8 Drawing Sheets

VIRTUALIZED AUTHENTICATION DEVICE

BACKGROUND

The following relates generally to one or more memory systems and more specifically to virtualized authentication device.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Some systems, such as vehicle systems, may utilize secure forms of data storage. For example, a vehicles self-driving system may utilize a secure storage device to store data and/or programs utilized by an autonomous driving system. In order to maintain the security of the data stored in the secure storage device, access by other devices of the vehicle system (or other systems) may be limited and in some cases, may be subject to authorization before access is granted. Some authorization techniques limit access to a secure storage device to devices that are physically integrated with or connected to the secure storage device (e.g., devices that are part of the secure storage device). Other devices, such as devices external to the secure storage device or virtual devices, may be unable to access the secure data due to this physical limitation.

Accessing secure data on a secure storage device may be possible via authenticating virtual devices (e.g., devices not physically integrated in the secure storage device). Authentication of virtual machines may involve the use of cryptographic keys and cryptographic engines, where partitions of the secure storage device are dedicated to individual virtual machines, and access to the individual partitions of the secure storage device is permitted based on an authentication procedure for each of the virtual machines. In some cases, the secure storage device may function as a centralized secure storage device for multiple virtual systems, rather than each virtual system having its own secure storage device. This may lower the cost associated with operating each system because one secured storage device may be utilized. This may also increase the level of security of the systems because one secure storage device is used for multiple components of the system.

Features of the disclosure are initially described in the context of a memory systems dies as described with reference to FIG. 1. Features of the disclosure are described in the context of methods and systems supporting a virtual authentication device as described with reference to FIGS. 2-3. These and other features of the disclosure are further illustrated by and described with reference to an apparatus diagram and flowcharts that relate to virtualized authentication device as described with references to FIGS. 4-8.

Figure 1:
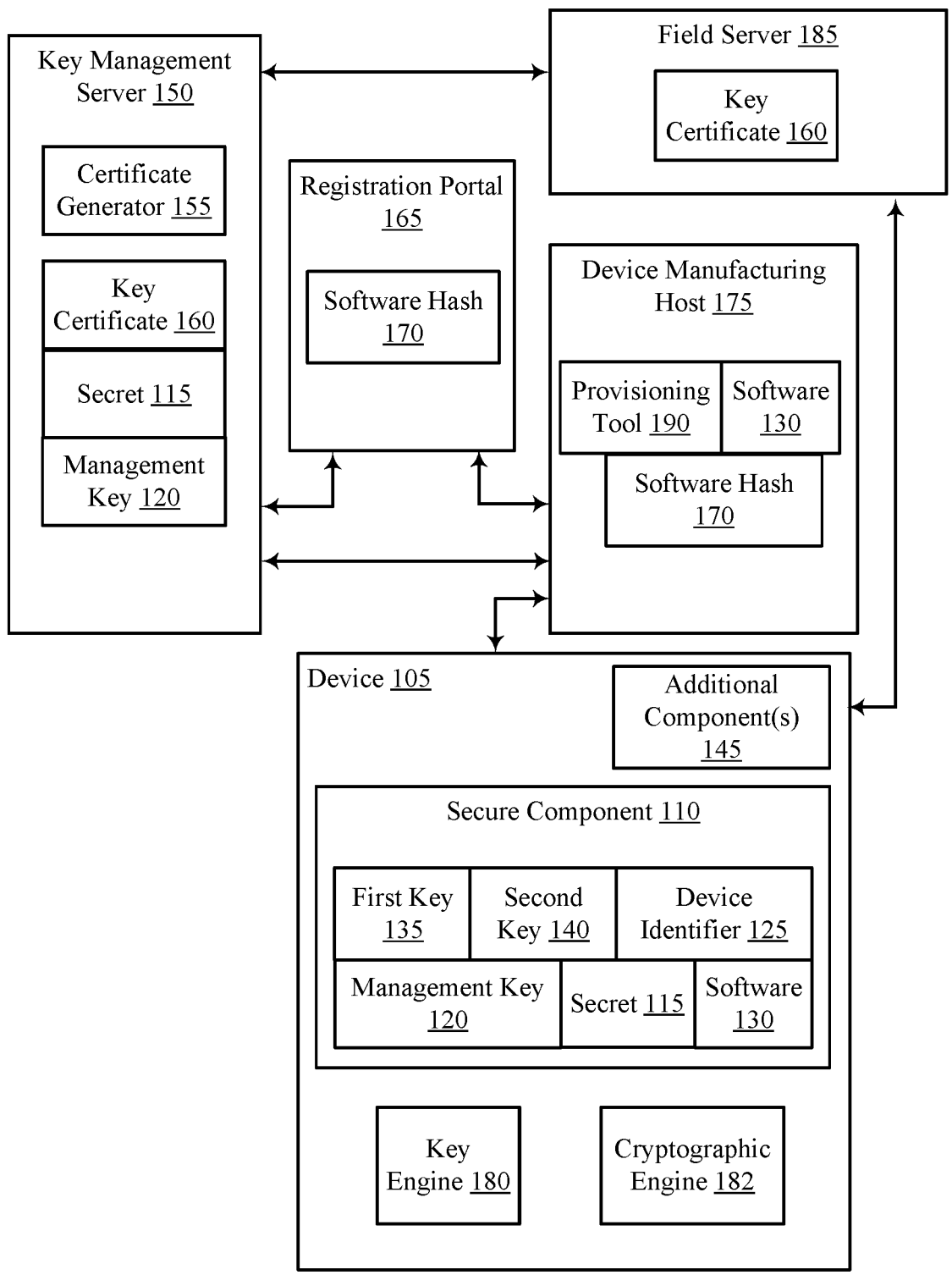
FIG. 1 illustrates an example of a system that supports virtualized authentication device in accordance with examples as disclosed herein.

FIG. 1 illustrates an example of a system 100 that supports virtualized authentication device in accordance with examples as disclosed herein. The system 100 may include a device 105, a key management server 150, a registration portal 165, a device manufacturing host 175, and a field server 185.

The device may be an example of a memory device that is configured to support one or more virtual machines. The device 105 may include a secure component 110 that is configured to securely store at least a secret 115. The secret 115 may be an example of a unique device secret (UDS). In some cases, the secure component 110 may store a management key 120. The management key 120 may be an example of a server root key (SRK). The server root key may allow an entity in possession of a copy of the management key 120 to manage the secure component 110 by turning on a security feature of the secure component 110. The device 105 may include one or more components associated with a memory device that are operable to perform one or more authentication procedures for the entire device 220. The device 105 may be an example of an infotainment system of a vehicle, a personal computer, a portable electronic device, a server, or any other type of computing device.

The secure component 110 may include a device identifier 125 generated according to a device identifier composition engine (DICE) standard or a standard associated with /RIoT or a combination thereof. In some cases, the device identifier 125 may be based on the secret 115 and the software 130. The device identifier 125 may be used to generate asymmetric key pairs, such as a first key pair 135 and a second key pair 140. The first key pair may be an example of an alias key pair, and the second key pair 140 may be an example of a device identification key pair. In some examples, the device 105 may include one or more additional component(s) 145 that are connected to the secure component 110 to provide the functionality of the device 105 in connection with the software 130.

In some examples, a set of commands may be executed in the device 105 to generate the device identifier 125 from the secret 115 and from a software hash 170, which may be cryptographic. In such cases, the device 105 may be in communication with the device manufacturing host 175. The device manufacturing host 175 may include a provisioning tool 190, the software 130, and the software hash 170. The execution of the set of commands may further generate the asymmetric key pair, such as the first key pair 135 and the second key pair 140.

The system 100 may include a key management server 150 that is in communication with the device manufacturing host 175. The key management server 150 may include a certificate generator 155. The certificate generator 155 may be configured to emulate a feature of the device 105 in generating the asymmetric key pairs. For example, the certificate generator 155 may be configured to use the same set of commands executed in the device 105 to generate the device identifier 125 from the copy of the secret 115 stored in the key management server 150 and from the software hash 170 received from a registration portal 165. In such cases, the registration portal 165 may be in communication with the device manufacturing host 175 and the key management server 150.

The set of commands executed in the certificate generator 155 may generate the asymmetric key pair (e.g., the first key pair 135 and the second key pair 140). For example, the software hash 170 and the secret 115 may be combined to create a key. In some examples, the certificate generator 155 may generate a certificate (e.g., key certificate 160) based on the key. For example, the certificate generator 155 can digitally sign a certificate (e.g., a key certificate 160) for the public key in the corresponding asymmetric key pair, using a private key of the certificate generator 155 or the key management server 150. The authenticity of the key certificate 160 may be verified via the public key of the certificate generator 155.

In some cases, the key management server 150 may provide the key certificate 160 of the device 105 to the field server 185, thereby enabling the field server 185 to authenticate the device 105 based on the public key certified by the certificate generator 155 and messages (e.g., certificates) signed by the device 105 using its corresponding private key. In such cases, the field server 185 may validate the authenticity of the public key having the certificate signed by the certificate generator 155.

Once a public key of the device 105 is certified, the device 105 may use the corresponding private key to authenticate itself to the field server 185. In some cases, the device 105 may use one or more keys to authenticate one or more virtual machines associated with the device with the field server 185 using the techniques described herein. In such cases, the device 105 may communicate directly with the field server 185. In some examples, the device 105 may digitally sign a message using the private key. If the public key that is associated with a private key of the device 105 is used to verify the digital signature of the certificate, the device 105 may be considered to have possession of the private key. In other examples, the device 105 may be considered to have the identity specified in the certificate signed by the public key. In such cases, the system 100 allows the device 105 to be loaded with software at a time and location different from the implementation of the secrets in the secure component 110 (e.g., management key 120 and secret 115). The system 100 may also allow the device 105 to connect to a service based on a valid public key.

The device 105 may be registered by uploading one or more software hashes 170 to the registration portal 165. The certificate generator 155 may generate a certificate for each software hash 170. In such cases, the key management server 150 may upload each version of the software hash 170 to the field server 185. When the device 105 presents a key to the field server 185, the field server 185 may connect the device 105 to the service associated with the device state (e.g., software hash 170). In some cases, different software hashes 170 may be associated with code or operating systems of different virtual machines of the device 105.

In some examples, the device 105 may modify a list of software hashes 170 uploaded to the registration portal 165. For example, the device 105 may request to add or remove the software hash 170 from the list of software hashes 170. In some examples, the device 105 may communicate the request to add or remove the software hash 170 directly to the key management server 150 rather than communicating with the key management server via the registration portal 165. The certificate generator 155 may regenerate a certificate based on if they software hash is removed or added.

In some examples, the field server 185 may include one or more key certificates 160. When the field server 185 receives a key from the device 105, the field server 185 may compare each of the key certificates 160 in the field server 185 to the received key. In other examples, the field server 185 may identify a key certificate 160 for comparison based on the device state. For example, the device 105 may send a notification to the field server 185 of the device state. Based on the device state, the field server 185 may check the certificate that corresponds to the device state.

In some examples, the device 105 may transmit a connection request to the field server 185. The request may include a key and device identifying information (e.g., a device identification (ID)). The field server 185 may match the connection request (e.g., the key) to a key certificate 160. If the key presented is not valid (e.g., does not match the key certificate 160), then the field server 185 may determine that the device 105 includes faulty or malicious software.

The system 100 may illustrate a process to onboard software 130 on the device 105 with a configuration for secure authentication of the device 105 in accessing the field server 185. For example, the secure component 110 may be configured in a factory without any knowledge or access to software 130 that may be subsequently developed and/or installed in the device 105 that uses the secure component 110. When the secure component 110 is the factory, secrets (e.g., management key 120 and secret 115) of a first root-of-trust may be injected into the secure component 110. A copy of the secrets may be stored into the key management server 150 (e.g., with an identification of the secure component 110) via a secure connection between the factory and the key management server 150.

In some examples, a device manufacturer develops a design of the device 105 that integrates the secure component 110 and additional components 145. The software 130 for operating the device 105 may become available at the facility (e.g., field server 185) of the device manufacturer. In some cases, the provisioning tool 190 may be used to install the software 130 in the secure component 110 and generate information about the software 130. The information about the software 130 may be used in the device 105 to generate the device identifier 125 of the device 105.

The information about the software 130 may be an example of the software hash 170 of the software 130. For example, the software hash 170 may be a cryptographic function of the source code of the software 130. In some cases, the software hash 170 may represent information of a second root-of-trust associated with the device manufacturer. In other examples, the software hash 170 may be digitally signed using a private key of the device manufacturer.

The software hash 170 used for the generation of keys in the device 105 may be communicated to the key management server 150 via a registration portal 165 during the registration of the secure component 110. In some cases, the software hash 170 may be provided to the device 105 as part of an installation process of the software 130 in the device 105. In such examples, the key certificate 160 stored on the field server 185 may be based on the software hash 170 of the original software. Any updates to the software 130 of the device may not be reflected in the key certificate 160 stored by the field server 185. Techniques for updating the certificate after a software update are described herein. In some examples, the certificate generator 155 may use the software hash 170 to generate a public key of the device 105, independent of the operations of the device 105, and sign the key certificate 160 for the public key of the device 105.

The registration portal 165 may use the management key 120 to manage the secure component 110 and activate the security feature of the secure component 110 after the registration of the secure component 110 and/or after the generation of the key certificate 160. After the security feature of the secure component 110 is activated, the secure component 110 installed in the device 105 may be used in generating the device identifier 125 of the device 105 and cryptographic keys (e.g., the first key pair 135 and the second key pair 140) of the device identifier 125.

The system 100 may include or support a key engine 180. The key engine 180 may be used to generate and associate one or more cryptographic keys with corresponding partitions of (e.g., groups of memory cells within) device 105. The cryptographic keys may then be assigned to one or more virtual machines coupled with device 105. The cryptographic keys may be used to authenticate or verify the identity of, or code operating on, one or more virtual machines, the device 105 itself, or a combination thereof. A virtual machine may be an example of an emulation of a computer system. In some cases, a virtual machine may be a software program or operating system that exhibits the behavior of a separate computer and may be capable of performing tasks such as running applications and programs like a separate computer. A virtual machine, sometimes referred to as a guest, may be created within another computing environment that may be referred as a "host." Multiple virtual machines can exist within a single host concurrently.

The system 100 may include or support a cryptographic engine 182. The cryptographic engine 182 may be used during an authentication process to authenticate the identity of, or the code operating on, one or more virtual machines connected to device 105. Cryptographic engine 182 may receive a message from one or more virtual machines that is signed with a cryptographic key. Cryptographic engine 182 may compare the received cryptographic key with a key assigned to the virtual machine, which may be assigned by key engine 180. In the event that verification of the keys is successful (e.g., the cryptographic key and the key assigned by the virtual machine match), the identity of the virtual machine is verified.

In some examples, the cryptographic engine 182 may verify the code operating on a given virtual machine by comparing a cryptographic key signed to a hash of code (e.g., a hash code generated by using a hash function on a portion of the code or all of the code) received from the virtual machine. In the case where the cryptographic key received with the hash of code matches the cryptographic key assigned to the virtual machine (e.g., as assigned via key engine 180), the code may be verified. Both key engine 180 and cryptographic engine 182 may be used to authenticate multiple virtual machines connected to device 105.

In some cases, key engine 180 and cryptographic engine 182 may also be used to verify the identity of, or code operating on, device 105. For example, the device 105 may be assigned a cryptographic key associated with a partition of memory cells (e.g., as assigned via key engine 180). Authentication of the identity of, or code operating on, device 105 may be performed by cryptographic engine 182. In some cases, key engine 180 or cryptographic engine 182 may be included within device 105. For instance, key engine 180 and/or cryptographic engine 182 may be part of memory controller or a local memory controller, or a separate component of the device 105.

Figure 2:
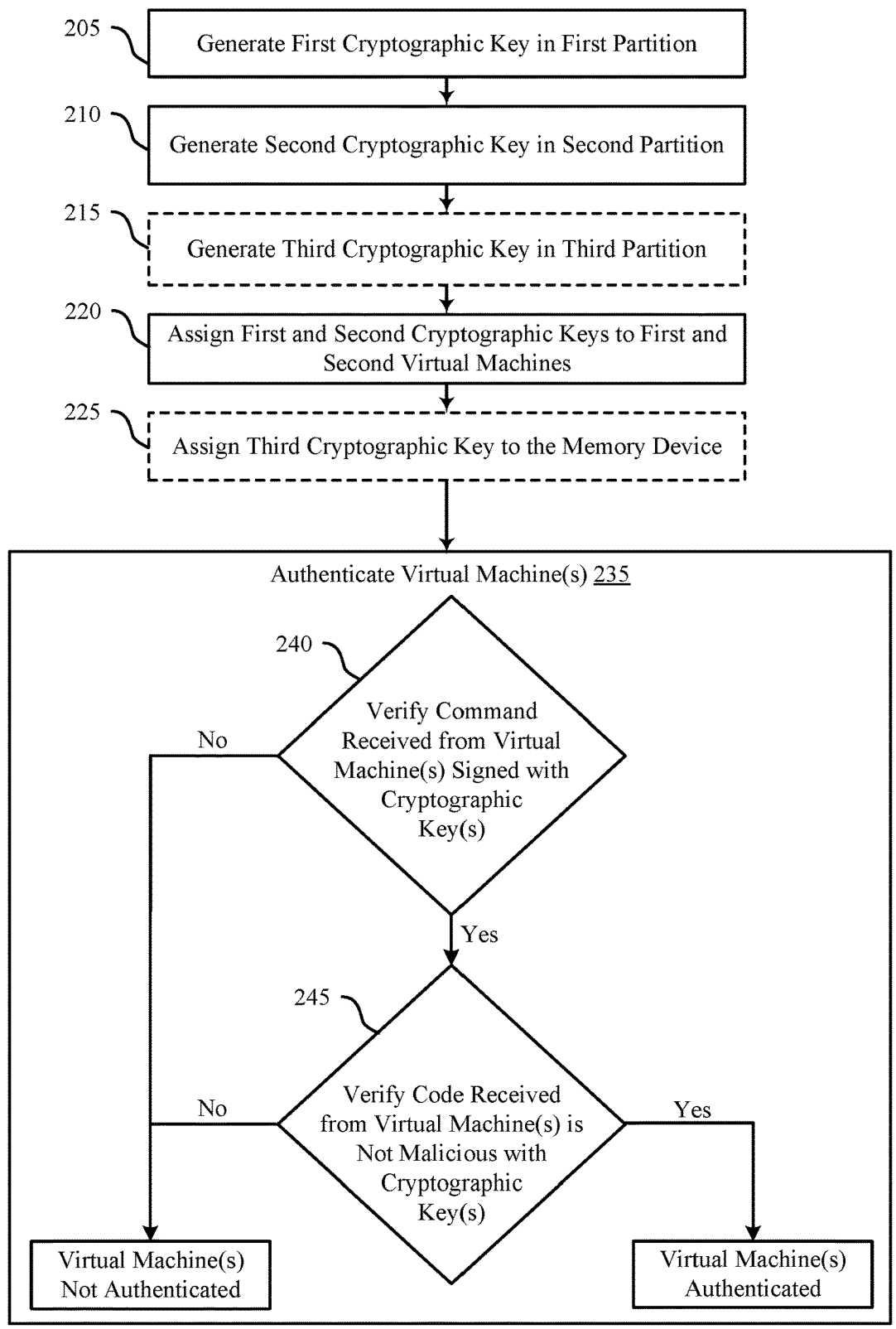
FIG. 2 illustrates an example of a flow diagram that supports virtualized authentication device in accordance with examples as disclosed herein.

FIG. 2 illustrates an example flow diagram 200 to authenticate one or more virtual devices in accordance with examples as disclosed herein. The method illustrated in the flow diagram 200 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some cases, the flow diagram 200 may be performed by one or more of the cryptographic engine 182, the key engine 180, and/or the device 105 of FIG. 1. Although shown in a particular sequence or order, unless otherwise specified, the order of the processes may be modified. Thus, the illustrated examples should be understood as examples, and the illustrated processes may be performed in a different order, and some processes may be performed in parallel. Additionally, one or more processes may be omitted in various examples. Thus, not all processes are used in every example. Other process flows are possible.

The flow diagram 200 may illustrates a method or methods for authenticating one or more virtual machines associated with a memory device. A processor may implement one or more virtual machines. To ensure security with each of the implemented virtual machines, the memory device may be configured to generate a unique cryptographic key for each virtual machine. The memory device may be configured to authenticate the virtual machines using such cryptographic keys.

At 205, a memory device may generate a first cryptographic key. The first cryptographic key may be a symmetric cryptographic key, an asymmetric cryptographic key, or another type of cryptographic key. The first cryptographic key may be generated based on a first partition of the memory device, a hash of at least a portion of software associated with one or more virtual machines, or a combination thereof. For example, a memory device may generate a first symmetric cryptographic key and store the first cryptographic key in the memory device. In some cases, the first cryptographic key may be stored in the first partition of the memory device. The partition of the memory device may be a group of memory cells separated (e.g., partitioned) from other memory cells within the memory device. In some cases, the first cryptographic key may be associated with this group (e.g., first group) of memory cells (e.g., partition) of the memory device and may not be associated with other groups.

At 210, a memory device may generate a second cryptographic key. The second cryptographic key may be a symmetric cryptographic key, an asymmetric cryptographic key, or another type of cryptographic key. The second cryptographic key may be generated based on a second partition of the memory device (e.g., a second group of memory cells within), a hash of at least a portion of software associated with one or more virtual machines, or a combination thereof. For example, a memory device may generate a second symmetric cryptographic key and store the second cryptographic key in the memory device. In some cases, the second cryptographic key may be stored in the second partition of the memory device. In some examples, the second cryptographic key may be associated with this group (e.g., second group) of memory cells (e.g., partition) of the memory device and may not be associated with other groups.

Optionally, at 215, a memory device may generate a third cryptographic key, which may be a symmetric cryptographic key, an asymmetric cryptographic key, or another type of cryptographic key. The third cryptographic key may be generated based on a third partition of the memory device (e.g., a third group of memory cells within), a hash of at least a portion of software associated with one or more virtual machines, or a combination thereof. For example, a memory device may generate a third symmetric cryptographic key and store the third cryptographic key in the memory device. In some cases, the third cryptographic key may be stored in the third partition of the memory device. The third cryptographic key may be associated with this group (third group) of memory cells (e.g., partition) of the memory device and may not be associated with other groups.

In some cases, the size of the third partition of the memory device (e.g., the partition that the third cryptographic key is assigned to) may be based on the remaining memory cells in the memory device after other keys have been generated. For example, as described herein, the first and second keys may be generated, stored in, and associated with the first and second partitions, which both include some number of memory cells based on respective sizes of the first and second partitions. In this case, the third cryptographic key may be associated with at least a portion of the remaining memory cells in the memory device.

The memory device maybe in communication with one or more virtual systems (e.g., virtual machines). For example, the memory device may be in communication with a first virtual machine, such as an infotainment system of a vehicle, and may also be in communication with a second virtual machine, such as a security system of the vehicle. At 220, the memory device may assign the cryptographic keys to one or more of the virtual machines connected to the memory device. For example, the memory device may assign the first cryptographic key (e.g., as associated with the first partition of the memory device) to the first virtual machine. For uniqueness, because the first cryptographic key has been assigned to the first virtual machine, the first cryptographic key may not be assigned to another virtual machine associated with the memory device. In another example, the memory device may assign the second cryptographic key (e.g., as associated with the second partition of the memory device) to the second virtual machine. Like the first cryptographic key, the second cryptographic key may not be assigned to another virtual machine associated with the memory device. These cryptographic keys may be communicated (e.g., sent) to the virtual machines by a variety of communication methods including over wireless communication, cloud network communication, and/or by wired communication. The cryptographic keys may be used to authenticate the virtual machines(s) during an authentication process according to techniques described herein.

Optionally, at 225, the third cryptographic key may be assigned to the memory device itself. In some examples, the third partition may be the remaining memory cells after the virtual machines partitions have been assigned. The third cryptographic key may be associated with the remaining memory cells, and the third cryptographic key may be assigned to the memory device for use in the authentication process of the memory device according to techniques described herein.

At 235, one or more of the virtual machines may be authenticated. Authentication of the virtual machines may involve the authentication of the identity of the virtual machines (e.g., at 240), an authentication of the code operating on the virtual machines (e.g., at 245), or a combination thereof.

At 240, the memory device may receive a command signed with the cryptographic key from the virtual machine. The memory device may verify the identity of the virtual machines by comparing the received command containing the cryptographic key from the virtual machine with the cryptographic key that was assigned to the virtual machine at 220. Because the cryptographic key may be associated with a single virtual machine (e.g., as assigned in 220), if the cryptographic key received from the virtual machine matches the cryptographic key associated with the corresponding partition in the memory device, then the identity of the virtual machine may be authenticated. However, in the case the that the cryptographic key received from the virtual machine does not match the cryptographic key assigned to the virtual machine (e.g., the keys are not the same), the virtual machine may not be authenticated, and access to the memory device may be prohibited.

In the case where the identity of the virtual machine has been authenticated (e.g., the cryptographic keys are determined to match at 240), at 245, the code operating on the virtual machine may be verified. Malicious code (e.g., computer viruses or other hacking techniques) may alter the code running on a virtual machine for its own purposes. Verifying the code as part of the authentication process may provide an additional layer of security. For example, the verification may be based upon measurements of the code operating on the virtual machine. In such cases, a hash of the code operating of the virtual machine may be generated and signed with the cryptographic key via the virtual machine. The hash of the code may be sent in the message to the memory device. The memory device may receive the hash of the code, and at 245, compare the cryptographic key received in the hash of the code to the cryptographic key assigned to the virtual machine. In the case where the cryptographic keys match (e.g., the received cryptographic key singed to the hash of code is the same as the assigned cryptographic key), the code may be measured and verified by the memory device. In some cases, the virtual machine may be authenticated, and access to the memory device may be permitted for the virtual machine. However, in the case where the cryptographic keys do not match, measurement of the code operating on the virtual machine may be prohibited, and the virtual machine may not be authenticated.

In some cases, the memory device itself may be verified via an authentication process. For example, the cryptographic key assigned to the memory device (e.g., a third cryptographic key, as assigned optionally at 235) may be compared with a message received from a controller within the memory device signed with a cryptographic key. Similar to 240, if the cryptographic keys match (e.g., the cryptographic key assigned to the third partition of the memory device matches the cryptographic key received in the message from the controller), then the identity of the memory device may be authenticated. In some examples, the memory device may receive a hash of code signed with the cryptographic key from a controller of the memory device. In the case that the cryptographic key received in the message signed to the hash of code matches the cryptographic key assigned to the third partition of the memory device, the code operating on the memory device may be authenticated. In this case, the memory device controller may be authenticated, and access to the memory device may be permitted.

Operations 240 and 245 may be performed for any number of virtual machines connected with the memory device. As described herein, two cryptographic keys may have been generated and assigned to two connected virtual machines. In other examples, any quantity of cryptographic keys may be generated and assigned to any quantity of virtual machines (e.g., one, two, three, four, five, six, seven, eight, etc.). Operations 240 and 245 may be performed to authenticate both of the virtual machines individually in two different authentication procedures (e.g., two different iterations at 235). In some cases, more virtual machines may be connected to the memory device, and more cryptographic keys may be generated in additional portions of the memory device and assigned to the additional virtual machines. In this case, the memory device may authenticate the additional virtual machines based upon the same process that the memory device authenticated the first and/or second virtual machines in another iteration of 235. For example, a fourth cryptographic key may be generated and assigned to a third virtual machine connected to the memory device. The third virtual machine may receive the cryptographic key from the memory device, and send a message to the memory device signed with the cryptographic key. The memory device may then authenticate the identity of the third virtual machine via comparing the received cryptographic key to the cryptographic key assigned to the fourth partition of the memory device. In the case where the cryptographic keys match, then the memory device may compare the cryptographic key signed to the hash of code (e.g., as received from the third virtual machine) to the cryptographic key assigned to the fourth partition of the memory device. In the event that these keys match, then the code operating on the third virtual machine may be authenticated. This procedure may be performed on any number of additional virtual machines connected to the memory device.

Figure 3:
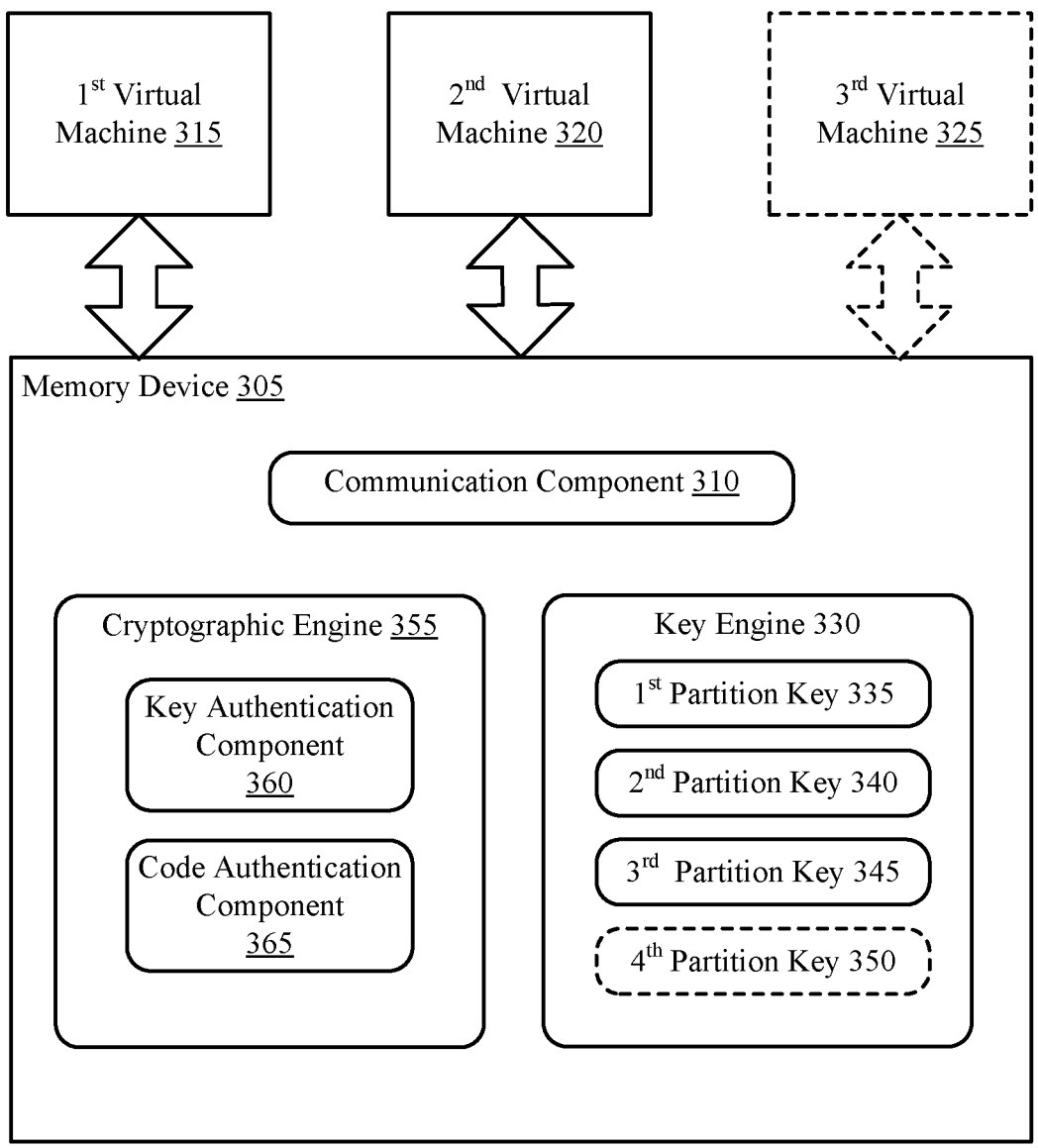
FIG. 3 illustrates an example of a system that supports virtualized authentication device in accordance with examples as disclosed herein.

FIG. 3 illustrates an example of a system 300 that supports authentication of virtual devices in accordance with examples as described herein. In some cases, system 300 may perform the method of flow diagram 200 as described with reference to FIG. 2.

System 300 may include a memory device 305. Memory device 305 may be an example of memory devices as described herein. Memory device 305 may be a secure storage device that limits access to secure data contained in memory device 305 to authorized systems. Memory device 305 may include communication component 310. Communication component 310 may be used to communicate with one or more virtual devices (e.g., systems, machines) within system 300. Communication component 310 may communicate with the virtual machines via a variety of methods such as wirelessly, over cloud network communication, or via a wired connection.

System 300 includes first virtual machine 315. First virtual machine 315 may be an example of a virtual device or system operating as part of or in conjunction with system 300. For example, first virtual machine 315 may be a security system, infotainment system, engine control system, or any other system operating within the vehicle. In some cases, the first virtual machine 315 may be another device outside or external to a vehicle, or unrelated to a vehicle, yet in communication with memory device 305. In some cases, system 300 may include more than one virtual machine (e.g., second virtual machine 320, third virtual machine 325). Second virtual machine 320 and third virtual machine 325 may be examples of systems or devices associated with a vehicle, or may be systems or devices not associated with a vehicle, yet in communication with memory device 305. In some cases, system 300 may include more than three virtual machines (e.g., four virtual machines, five virtual machines, six virtual machines, seven virtual machines, eight virtual machines, nine virtual machines etc.), and the additional virtual machines may also be in communication with memory device 305.

Each virtual machine (e.g., first virtual machine 315, second virtual machine 320, and third virtual machine 325) may be in communication with memory device 305 through communication component 310 and may access secure data stored in memory device 305 through communication component 310. In order for each virtual machine to access the secure data in memory device 305, each virtual machine may be authenticated. The authentication of each virtual machine may be based upon authentication of a cryptographic key associated with each virtual machine and authentication of the code operating on each virtual machine, as described with reference to flow diagram 200 in FIG. 2.

Memory device 305 may include key engine 330. Key engine 330 may be an example of key engine 180 as described with reference to FIG. 1. Key engine 330 may generate cryptographic keys specific to certain partitions (e.g., groups) of memory cells within memory device 305. As described with reference to operations 205-215 of flow diagram 200, key engine 330 may generate multiple cryptographic keys, and associate the cryptographic keys with different partitions of memory cells within memory device 305. For example, key engine 330 may generate a first partition key 335 and associate the first partition key 335 with a first partition of memory cells within memory device 305. In another example, key engine 330 may generate a second partition key 340 and associate the second partition key 340 with a second partition of memory cells within memory device 305. In another example, key engine 330 may generate a third partition key 345 and associate the third partition key 345 with a third partition of memory cells within memory device 305. In still another example, key engine 330 may generate a fourth partition key 350 and associate the fourth partition key 350 with a fourth partition of memory cells within memory device 305. In these examples, each partition key (e.g., partition keys 335, 340, 345, and 350) may be different cryptographic keys associated with respective partitions of memory cells of memory device 305. In some examples, the key engine 330 may generate any quantity of key partitions (e.g., one, two, three, four, five, six, seven, eight, etc.) using any quantity of portions of the memory cells (e.g., one, two, three, four, five, six, seven, eight, etc.).

Key engine 330 may assign the cryptographic keys associated with the different partitions to different devices or virtual machines associated with the memory device 305. As described with reference to operation 225 of flow diagram 200, key engine 330 may assign a cryptographic key to at least a portion of the connected virtual machines. For example, key engine 330 may assign first partition key 335 to first virtual machine 315 and second partition key 340 to second virtual machine 320. Communication component 310 may communicate the assigned keys to each virtual machine, and the cryptographic keys may be stored in each virtual machine respectively. In some cases, the key engine 330 may also assign a cryptographic key to the memory device itself, as described with reference to 225 of flow diagram 200. For example, key engine 330 may assigned third partition key 345 to the memory device. Each of the cryptographic keys may be used to authenticate the virtual machine or memory device 305 in an authentication process as described with reference to 235 of FIG. 2.

Memory device 305 includes cryptographic engine 355. Cryptographic engine 355 may be an example of cryptographic engine 182, as described with reference to FIG. 1. Cryptographic engine 355 may be used to authenticate virtual devices associated with memory device 305. As described with reference to flow diagram 200, the memory device 305 may receive messages from the virtual machines signed with cryptographic keys. The cryptographic keys may be the keys sent to the virtual machines via communication component 310 at 220. For example, memory device 305 may receive a message from first virtual machine 315 through communication component 310. The message may contain a signature containing a cryptographic key. In some cases, the cryptographic key signed to the message may be the same as first partition key 335, which was associated with first virtual machine 315. As another example, memory device 305 may receive a message from second virtual machine 320 through communication component 310. The message may contain a signature containing a cryptographic key. In some cases, the cryptographic key signed to the message may be the same as second partition key 340, which is associated with second virtual machine 320.

Cryptographic engine 355 may include key authentication component 360 and code authentication component 365. As described with reference to operation 235 of flow diagram 200, key authentication component 360 and code authentication component 365 may be used to authenticate the virtual machines or the memory device 305. For example, key authentication component 360 may verify the identity of the virtual machines by comparing the received command containing the cryptographic keys from the virtual machines with the partition keys that were assigned to the virtual machines at 220 of flow diagram 200 of FIG. 2. For example, key authentication component 360 may compare the received cryptographic key in the message from first virtual machine 315 to first partition key 335. In the case where the keys match, the identity of first virtual machine 315 is authenticated. In the case where the keys do not match, then the identity of first virtual machine 315 may not be authenticated, and access to the memory device 305 may be prohibited.

In some examples, key authentication component 360 may compare the received cryptographic key in the message from second virtual machine 320 to second partition key 340. In the case where the keys match, the identity of second virtual machine 320 is verified. In the case where the keys do not match, then the identity of second virtual machine 320 may not be verified, and access to the memory device may be prohibited.

In some examples, key authentication component 360 may compare the received cryptographic key in a message from a controller associated with memory device 305 to third partition key 345. In the case where the keys match, the identity of the memory device is authenticated. In the case where the keys do not match, then the identity of memory device 305 may not be authenticated, and access to the secure data in memory device 305 by the controller may be prohibited.

As described with reference to 245 of flow diagram 200, code authentication component 365 may authenticate the code operating on the virtual machines after the identity of the virtual machines have been verified. The code operating on the virtual machines may be authenticated by comparing the cryptographic key signed to the hash of code received by communication component 310 to the partition key associated with the virtual machine. For example, code authentication component 365 may compare the cryptographic key received in the signature of the hash of code from first virtual machine 315 to first partition key 335. In the case where the keys match, the code operating on first virtual machine 315 may be authenticated where the hash of code may be processed by memory device 305. In some examples, measurements of the code may be taken. The measurements may be used to determine that the code operating on first virtual machine 315 is not malicious. In the case where the keys do not match, then the code may not be authenticated, and measurement of the code of first virtual machine 315 may be prohibited.

In some examples, code authentication component 365 may compare the cryptographic key received in the signature of the hash of code from second virtual machine 320 to second partition key 340. In the case where the keys match, the code operating on second virtual machine 320 may be authenticated where the hash of code may be processed by memory device 305 and measurements of the code may be taken. The measurements may be used to determine that the code operating on second virtual machine 320 is not malicious. In the case where the keys do not match, the code may not be authenticated, and measurement of the code of second virtual machine 320 may not occur.

In some examples, code authentication component 365 may compare the cryptographic key received in the signature of the hash of code from a controller of memory device 305 to third partition key 345. In the case where the keys match, the code operating on the memory device 305 may be authenticated where the hash of code may be processed and measurements of the code may be taken. The measurements may be used to determine that the code operating on memory device 305 is not malicious. In the case where the keys do not match, then the code may not be authenticated, and measurement of the code may be prohibited. In the case where the identity of the virtual machine is authenticated (e.g., via key authentication component 360) and the code operating on the virtual machine is authenticated (e.g., via code authentication component 365), then the virtual machine may be authenticated, and access to the secure data stored in memory device 305 may be permitted. However, in the case that either key authentication component 360 does not authenticate the identity of the virtual machine or code authentication component 365 does not authenticate the code operating on the virtual machine, then the virtual machine may not be authorized to access the secure data stored on memory device 305.

Key authentication component 360 and code authentication component 365 may be used to authenticate any number of virtual machines connected with memory device 305. For example, the identity of third virtual machine 325 may be authenticated by key authentication component 360 and the code operating on third virtual machine 325 may be authenticated by code authentication component 365. The authentication of any number of virtual machines may be used to allow access to the secure data in memory device 305, virtually, by a number of virtual devices.

Figure 4:
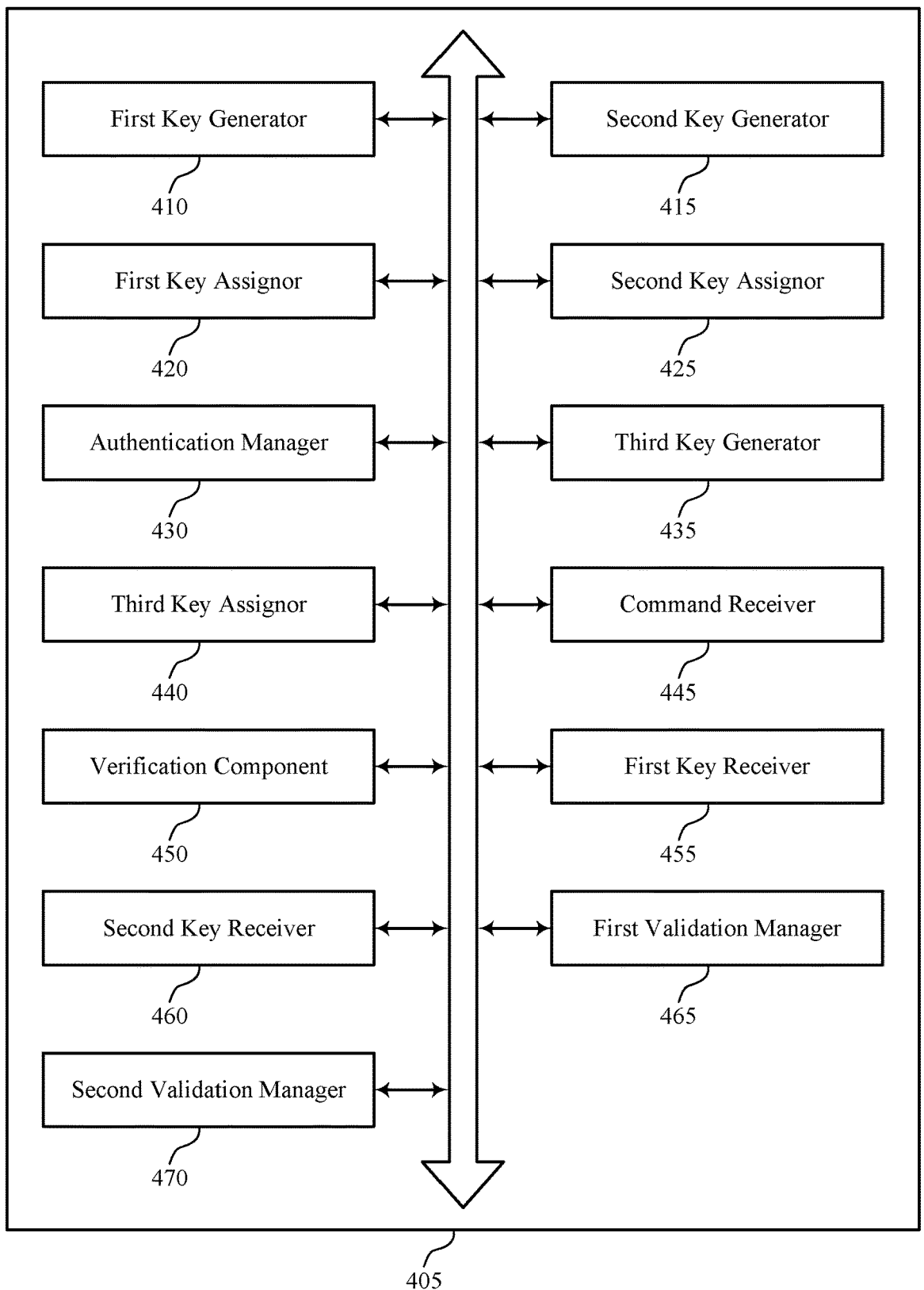
FIG. 4 shows a block diagram of a memory device that supports virtualized authentication device in accordance with examples as disclosed herein.

FIG. 4 shows a block diagram 400 of a memory device 405 that supports virtualized authentication device in accordance with examples as disclosed herein. The memory device 405 may be an example of aspects of a memory device as described with reference to FIGS. 1 and 3. The memory device 405 may include a first key generator 410, a second key generator 415, a first key assignor 420, a second key assignor 425, an authentication manager 430, a third key generator 435, a third key assignor 440, a command receiver 445, a verification component 450, a first key receiver 455, a second key receiver 460, a first validation manager 465, and a second validation manager 470. Each of these modules may communicate, directly or indirectly, with one another (e.g., via one or more buses).

The first key generator 410 may generate a first device-specific cryptographic key based on a first partition of a memory device. In some cases, the first partition is associated with a first set of memory cells of the memory device and the second partition is associated with a second set of memory cells of the memory device different from the first set of memory cells.

The second key generator 415 may generate a second device-specific cryptographic key based on a second partition of the memory device.

The first key assignor 420 may assign the first device-specific cryptographic key to a first virtual machine associated with the memory device.

The second key assignor 425 may assign the second device-specific cryptographic key to a second virtual machine associated with the memory device and different from the first virtual machine.

The authentication manager 430 may authenticate at least one of the first virtual machine or the second virtual machine based on respective ones of the first device-specific cryptographic key or the second device-specific cryptographic key.

The third key generator 435 may generate a third device-specific cryptographic key based on the memory device. In some cases, the third device-specific cryptographic key is generated based on the first partition of the memory device and the second partition of the memory device. In some cases, the third device-specific cryptographic key is generated based on a third partition of the memory device that is different from the first partition and the second partition. In some cases, the third partition corresponds to all memory cells of the memory device.

The third key assignor 440 may assign the third device-specific cryptographic key to the memory device.

The command receiver 445 may receive, from the first virtual machine, a command signed with a first signature associated with the first virtual machine. In some examples, the command receiver 445 may receive, from the second virtual machine, a second command signed with a second signature associated with the second virtual machine.

The verification component 450 may verify that the first signature is valid based on an authentication procedure using the first device-specific cryptographic key. In some examples, the verification component 450 may verify that code of an operating system associated with the first virtual machine is non-malicious based on the first signature, where authenticating the first virtual machine is further based on verifying that the code of the operating system is non-malicious. In some examples, the verification component 450 may verify that the second signature is valid based on a second authentication procedure using the second device-specific cryptographic key. In some examples, the verification component 450 may verify that code of an operating system associated with the second virtual machine is non-malicious based on the second signature, where authenticating the second virtual machine is further based on verifying that the code of the operating system is non-malicious.

The first key receiver 455 may receive a first cryptographic key from a first virtual machine associated with a memory device. In some cases, the first cryptographic key is specific to a first partition of memory cells of the memory device.

The second key receiver 460 may receive a second cryptographic key from a second virtual machine associated with the memory device. In some cases, the second cryptographic key is specific to a second partition of memory cells of the memory device different than the first partition of memory cells.

The first validation manager 465 may perform a first authentication procedure for the first virtual machine based on validating the first cryptographic key by the memory device. In some examples, the first validation manager 465 may verify that code of an operating system associated with the first virtual machine is non-malicious based on the first cryptographic key, where performing the first authentication procedure is based on verifying that the code of the operating system is non-malicious. In some examples, the first validation manager 465 may generate a hash of the code of the operating system associated with the first virtual machine, where verifying that the code is non-malicious is based on generating the hash of the code. In some examples, the first validation manager 465 may verify that the received first cryptographic signature is valid, and where performing the first authentication procedure is further based on verifying that the received first cryptographic signature is valid.

The second validation manager 470 may perform a second authentication procedure for the second virtual machine based on validating the second cryptographic key by the memory device. In some examples, the second validation manager 470 may verify that code of a second operating system associated with the second virtual machine is non-malicious based on the second cryptographic key, where performing the second authentication procedure is based on verifying that the code of the second operating system is non-malicious. In some examples, the second validation manager 470 may verify that the received second cryptographic signature is valid, and where performing the first authentication procedure is further based on verifying that the received second cryptographic signature is valid.

Figure 5:
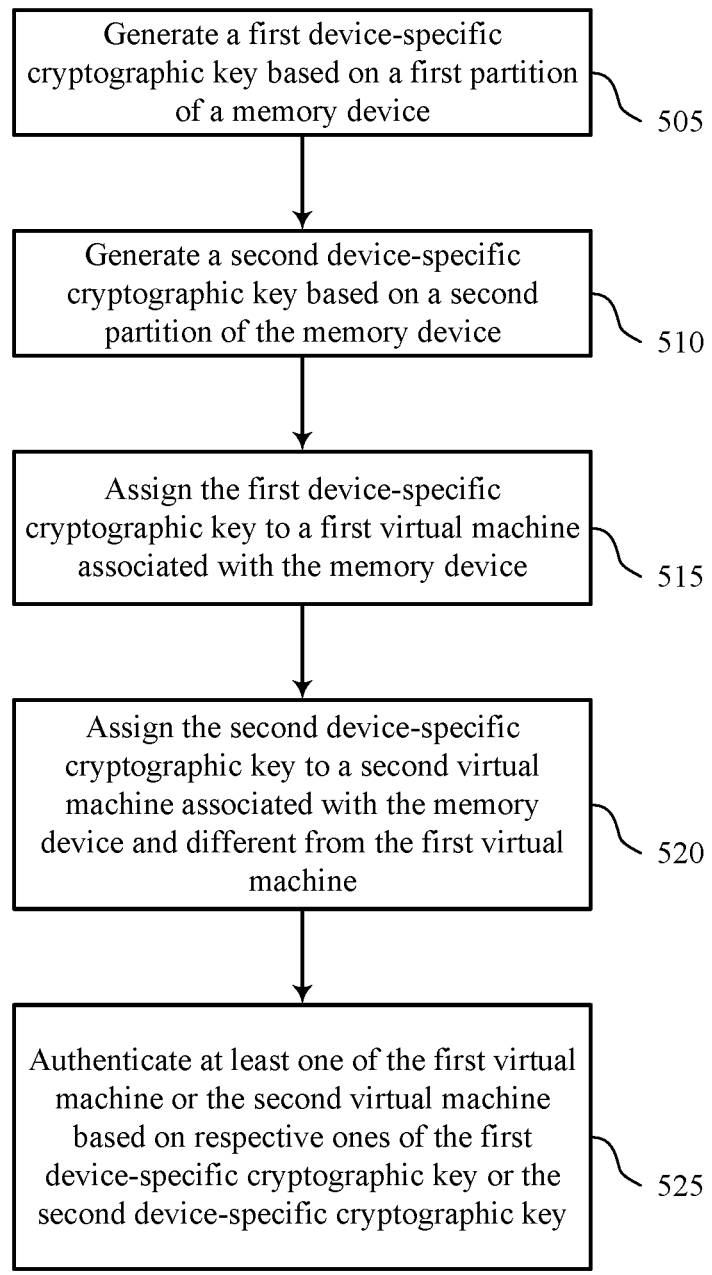
FIGS. 5 through 8 show flowcharts illustrating a method or methods that support virtualized authentication device in accordance with examples as disclosed herein.

FIG. 5 shows a flowchart illustrating a method or methods 500 that supports virtualized authentication device in accordance with examples as disclosed herein. The operations of method 500 may be implemented by a memory device or its components as described herein. For example, the operations of method 500 may be performed by a memory device as described with reference to FIG. 4. In some examples, a memory device may execute a set of instructions to control the functional elements of the memory device to perform the described functions. Additionally or alternatively, a memory device may perform aspects of the described functions using special-purpose hardware.

At 505, the memory device may generate a first device-specific cryptographic key based on a first partition of a memory device. The operations of 505 may be performed according to the methods described herein. In some examples, aspects of the operations of 505 may be performed by a first key generator as described with reference to FIG. 4.

At 510, the memory device may generate a second device-specific cryptographic key based on a second partition of the memory device. The operations of 510 may be performed according to the methods described herein. In some examples, aspects of the operations of 510 may be performed by a second key generator as described with reference to FIG. 4.

At 515, the memory device may assign the first device-specific cryptographic key to a first virtual machine associated with the memory device. The operations of 515 may be performed according to the methods described herein. In some examples, aspects of the operations of 515 may be performed by a first key assignor as described with reference to FIG. 4.

At 520, the memory device may assign the second device-specific cryptographic key to a second virtual machine associated with the memory device and different from the first virtual machine. The operations of 520 may be performed according to the methods described herein. In some examples, aspects of the operations of 520 may be performed by a second key assignor as described with reference to FIG. 4.

At 525, the memory device may authenticate at least one of the first virtual machine or the second virtual machine based on respective ones of the first device-specific cryptographic key or the second device-specific cryptographic key. The operations of 525 may be performed according to the methods described herein. In some examples, aspects of the operations of 525 may be performed by an authentication manager as described with reference to FIG. 4.

In some examples, an apparatus as described herein may perform a method or methods, such as the method 500. The apparatus may include features, means, or instructions (e.g., a non-transitory computer-readable medium storing instructions executable by a processor) for generating a first device-specific cryptographic key based on a first partition of a memory device, generating a second device-specific cryptographic key based on a second partition of the memory device, assigning the first device-specific cryptographic key to a first virtual machine associated with the memory device, assigning the second device-specific cryptographic key to a second virtual machine associated with the memory device and different from the first virtual machine, and authenticating at least one of the first virtual machine or the second virtual machine based on respective ones of the first device-specific cryptographic key or the second device-specific cryptographic key.

In some examples of the method 500 and the apparatus described herein, the first partition may be associated with a first set of memory cells of the memory device and the second partition may be associated with a second set of memory cells of the memory device different from the first set of memory cells.

Some examples of the method 500 and the apparatus described herein may further include operations, features, means, or instructions for generating a third device-specific cryptographic key based on the memory device, and assigning the third device-specific cryptographic key to the memory device.

In some examples of the method 500 and the apparatus described herein, the third device-specific cryptographic key may be generated based on the first partition of the memory device and the second partition of the memory device.

In some examples of the method 500 and the apparatus described herein, the third device-specific cryptographic key may be generated based on a third partition of the memory device that may be different from the first partition and the second partition.

In some examples of the method 500 and the apparatus described herein, the third partition corresponds to all memory cells of the memory device.

In some examples of the method 500 and the apparatus described herein, authenticating the first virtual machine may include operations, features, means, or instructions for receiving, from the first virtual machine, a command signed with a first signature associated with the first virtual machine, and verifying that the first signature may be valid based on an authentication procedure using the first device-specific cryptographic key.

In some examples of the method 500 and the apparatus described herein, authenticating the first virtual machine further may include operations, features, means, or instructions for verifying that code of an operating system associated with the first virtual machine may be non-malicious based on the first signature, where authenticating the first virtual machine may be further based on verifying that the code of the operating system may be non-malicious.

In some examples of the method 500 and the apparatus described herein, authenticating the second virtual machine may include operations, features, means, or instructions for receiving, from the second virtual machine, a second command signed with a second signature associated with the second virtual machine, and verifying that the second signature may be valid based on a second authentication procedure using the second device-specific cryptographic key.

In some examples of the method 500 and the apparatus described herein, authenticating the second virtual machine further may include operations, features, means, or instructions for verifying that code of an operating system associated with the second virtual machine may be non-malicious based on the second signature, where authenticating the second virtual machine may be further based on verifying that the code of the operating system may be non-malicious.

Figure 6:
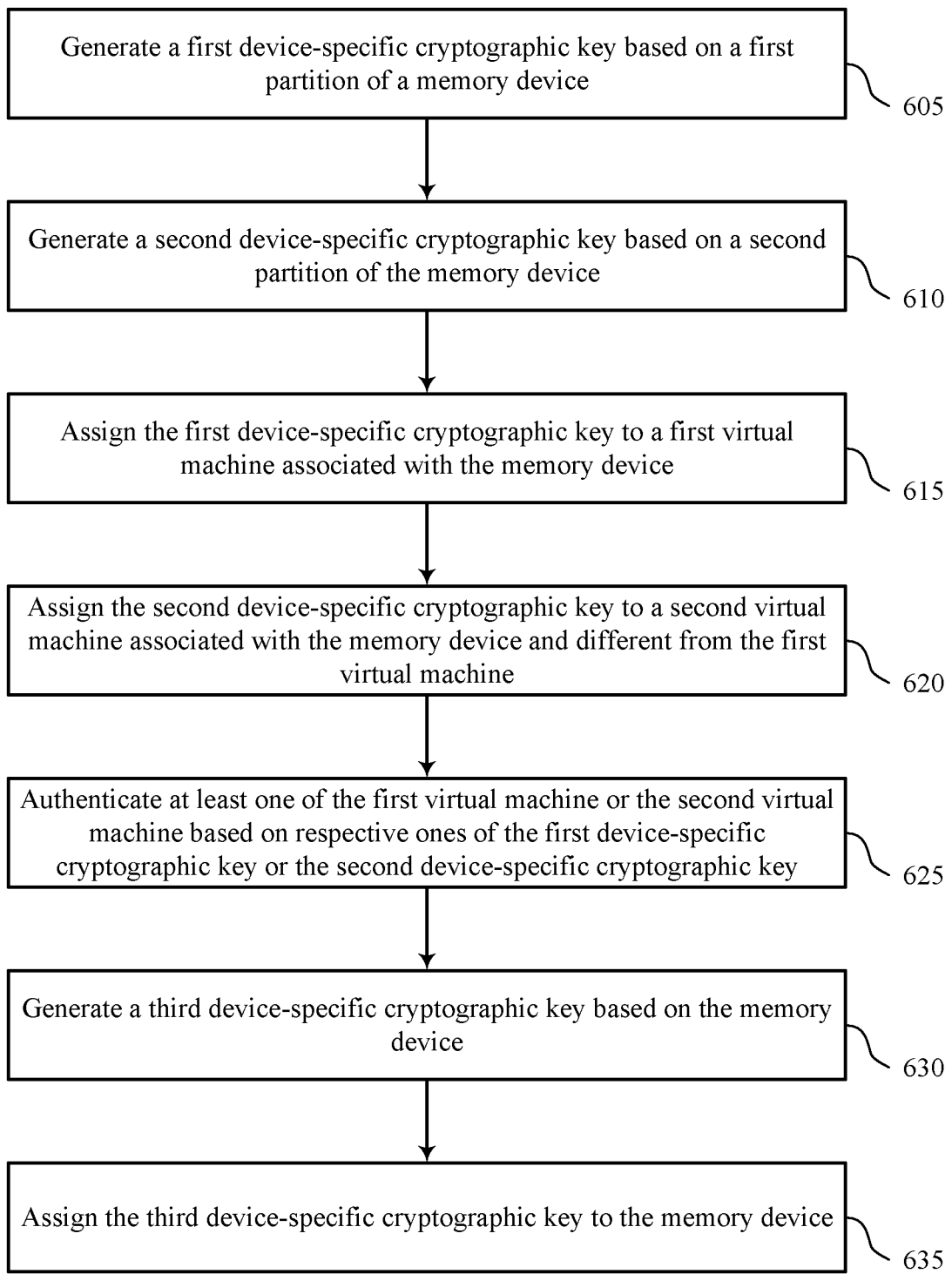

FIG. 6 shows a flowchart illustrating a method or methods 600 that supports virtualized authentication device in accordance with examples as disclosed herein. The operations of method 600 may be implemented by a memory device or its components as described herein. For example, the operations of method 600 may be performed by a memory device as described with reference to FIG. 4. In some examples, a memory device may execute a set of instructions to control the functional elements of the memory device to perform the described functions. Additionally or alternatively, a memory device may perform aspects of the described functions using special-purpose hardware.

At 605, the memory device may generate a first device-specific cryptographic key based on a first partition of a memory device. The operations of 605 may be performed according to the methods described herein. In some examples, aspects of the operations of 605 may be performed by a first key generator as described with reference to FIG. 4.

At 610, the memory device may generate a second device-specific cryptographic key based on a second partition of the memory device. The operations of 610 may be performed according to the methods described herein. In some examples, aspects of the operations of 610 may be performed by a second key generator as described with reference to FIG. 4.

At 615, the memory device may assign the first device-specific cryptographic key to a first virtual machine associated with the memory device. The operations of 615 may be performed according to the methods described herein. In some examples, aspects of the operations of 615 may be performed by a first key assignor as described with reference to FIG. 4.

At 620, the memory device may assign the second device-specific cryptographic key to a second virtual machine associated with the memory device and different from the first virtual machine. The operations of 620 may be performed according to the methods described herein. In some examples, aspects of the operations of 620 may be performed by a second key assignor as described with reference to FIG. 4.

At 625, the memory device may authenticate at least one of the first virtual machine or the second virtual machine based on respective ones of the first device-specific cryptographic key or the second device-specific cryptographic key. The operations of 625 may be performed according to the methods described herein. In some examples, aspects of the operations of 625 may be performed by an authentication manager as described with reference to FIG. 4.

At 630, the memory device may generate a third device-specific cryptographic key based on the memory device. The operations of 630 may be performed according to the methods described herein. In some examples, aspects of the operations of 630 may be performed by a third key generator as described with reference to FIG. 4.

At 635, the memory device may assign the third device-specific cryptographic key to the memory device. The operations of 635 may be performed according to the methods described herein. In some examples, aspects of the operations of 635 may be performed by a third key assignor as described with reference to FIG. 4.

Figure 7:
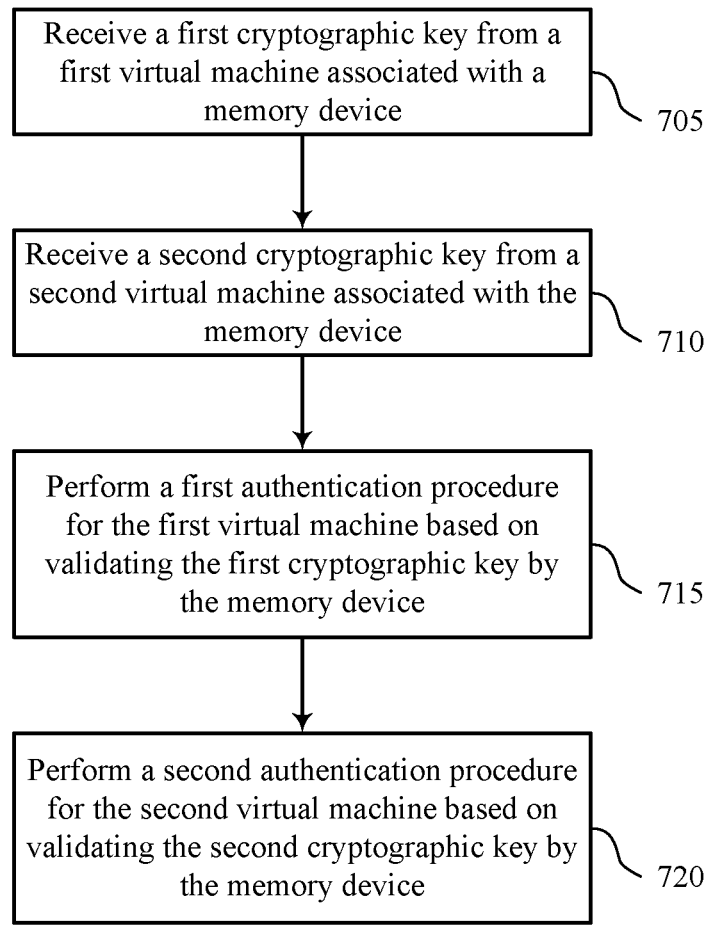

FIG. 7 shows a flowchart illustrating a method or methods 700 that supports virtualized authentication device in accordance with examples as disclosed herein. The operations of method 700 may be implemented by a memory device or its components as described herein. For example, the operations of method 700 may be performed by a memory device as described with reference to FIG. 4. In some examples, a memory device may execute a set of instructions to control the functional elements of the memory device to perform the described functions. Additionally or alternatively, a memory device may perform aspects of the described functions using special-purpose hardware.

At 705, the memory device may receive a first cryptographic key from a first virtual machine associated with a memory device. The operations of 705 may be performed according to the methods described herein. In some examples, aspects of the operations of 705 may be performed by a first key receiver as described with reference to FIG. 4.

At 710, the memory device may receive a second cryptographic key from a second virtual machine associated with the memory device. The operations of 710 may be performed according to the methods described herein. In some examples, aspects of the operations of 710 may be performed by a second key receiver as described with reference to FIG. 4.

At 715, the memory device may perform a first authentication procedure for the first virtual machine based on validating the first cryptographic key by the memory device. The operations of 715 may be performed according to the methods described herein. In some examples, aspects of the operations of 715 may be performed by a first validation manager as described with reference to FIG. 4.

At 720, the memory device may perform a second authentication procedure for the second virtual machine based on validating the second cryptographic key by the memory device. The operations of 720 may be performed according to the methods described herein. In some examples, aspects of the operations of 720 may be performed by a second validation manager as described with reference to FIG. 4.

In some examples, an apparatus as described herein may perform a method or methods, such as the method 700. The apparatus may include features, means, or instructions (e.g., a non-transitory computer-readable medium storing instructions executable by a processor) for receiving a first cryptographic key from a first virtual machine associated with a memory device, receiving a second cryptographic key from a second virtual machine associated with the memory device, performing a first authentication procedure for the first virtual machine based on validating the first cryptographic key by the memory device, and performing a second authentication procedure for the second virtual machine based on validating the second cryptographic key by the memory device.

Some examples of the method 700 and the apparatus described herein may further include operations, features, means, or instructions for verifying that code of an operating system associated with the first virtual machine may be non-malicious based on the first cryptographic key, where performing the first authentication procedure may be based on verifying that the code of the operating system may be non-malicious.

Some examples of the method 700 and the apparatus described herein may further include operations, features, means, or instructions for generating a hash of the code of the operating system associated with the first virtual machine, where verifying that the code may be non-malicious may be based on generating the hash of the code.

Some examples of the method 700 and the apparatus described herein may further include operations, features, means, or instructions for verifying that the received first cryptographic signature may be valid, and where performing the first authentication procedure may be further based on verifying that the received first cryptographic signature may be valid.

Some examples of the method 700 and the apparatus described herein may further include operations, features, means, or instructions for verifying that code of a second operating system associated with the second virtual machine may be non-malicious based on the second cryptographic key, where performing the second authentication procedure may be based on verifying that the code of the second operating system may be non-malicious.

Some examples of the method 700 and the apparatus described herein may further include operations, features, means, or instructions for verifying that the received second cryptographic signature may be valid, and where performing the first authentication procedure may be further based on verifying that the received second cryptographic signature may be valid.

In some examples of the method 700 and the apparatus described herein, the first cryptographic key may be specific to a first partition of memory cells of the memory device, and the second cryptographic key may be specific to a second partition of memory cells of the memory device different than the first partition of memory cells.

Figure 8:
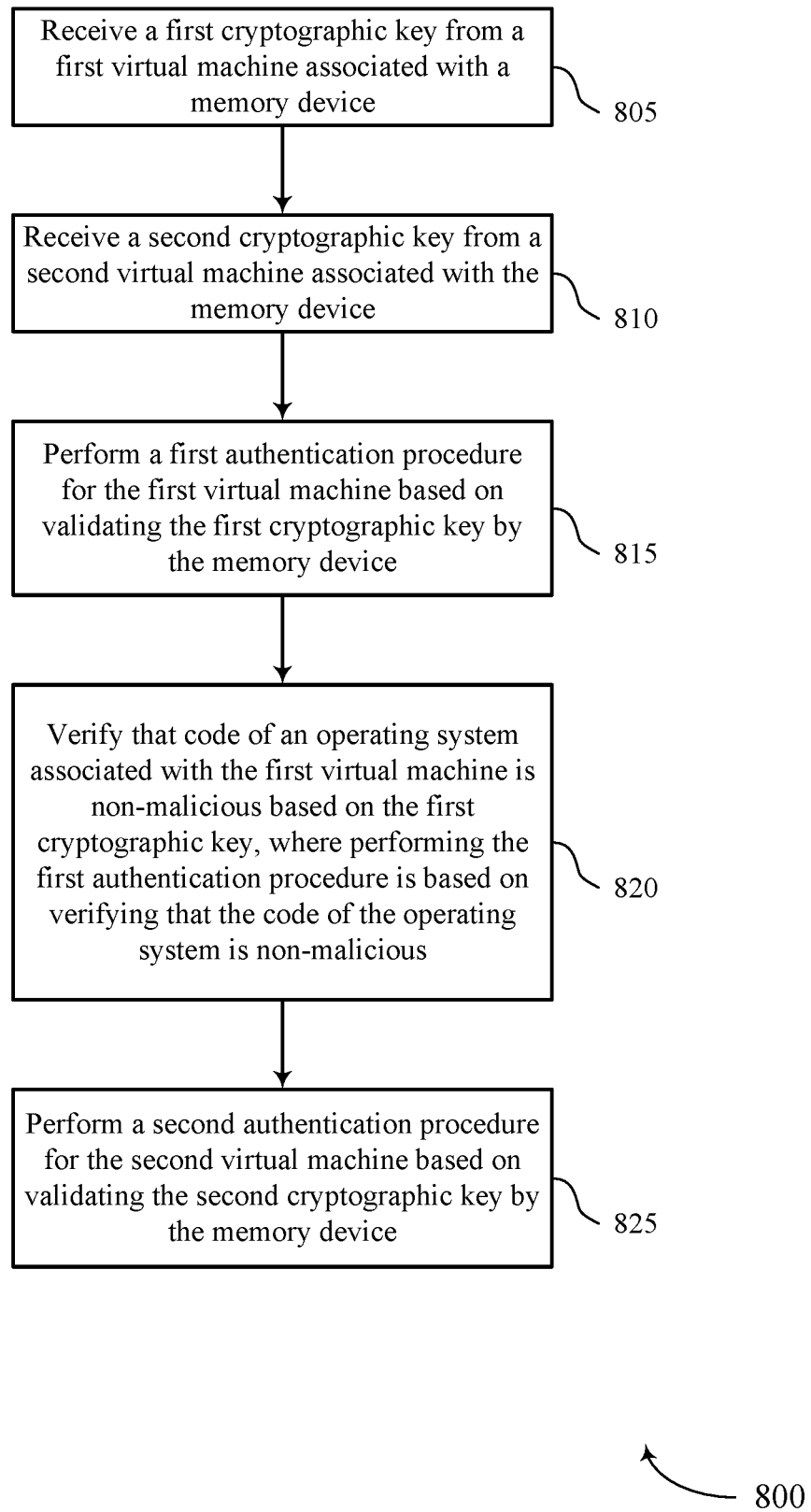

FIG. 8 shows a flowchart illustrating a method or methods 800 that supports virtualized authentication device in accordance with examples as disclosed herein. The operations of method 800 may be implemented by a memory device or its components as described herein. For example, the operations of method 800 may be performed by a memory device as described with reference to FIG. 4. In some examples, a memory device may execute a set of instructions to control the functional elements of the memory device to perform the described functions. Additionally or alternatively, a memory device may perform aspects of the described functions using special-purpose hardware.

At 805, the memory device may receive a first cryptographic key from a first virtual machine associated with a memory device. The operations of 805 may be performed according to the methods described herein. In some examples, aspects of the operations of 805 may be performed by a first key receiver as described with reference to FIG. 4.

At 810, the memory device may receive a second cryptographic key from a second virtual machine associated with the memory device. The operations of 810 may be performed according to the methods described herein. In some examples, aspects of the operations of 810 may be performed by a second key receiver as described with reference to FIG. 4.

At 815, the memory device may perform a first authentication procedure for the first virtual machine based on validating the first cryptographic key by the memory device. The operations of 815 may be performed according to the methods described herein. In some examples, aspects of the operations of 815 may be performed by a first validation manager as described with reference to FIG. 4.

At 820, the memory device may verify that code of an operating system associated with the first virtual machine is non-malicious based on the first cryptographic key, where performing the first authentication procedure is based on verifying that the code of the operating system is non-malicious. The operations of 820 may be performed according to the methods described herein. In some examples, aspects of the operations of 820 may be performed by a first validation manager as described with reference to FIG. 4.

At 825, the memory device may perform a second authentication procedure for the second virtual machine based on validating the second cryptographic key by the memory device. The operations of 825 may be performed according to the methods described herein. In some examples, aspects of the operations of 825 may be performed by a second validation manager as described with reference to FIG. 4.

It should be noted that the methods described above describe possible implementations, and that the operations and the steps may be rearranged or otherwise modified and that other implementations are possible. Furthermore, portions from two or more of the methods may be combined.

An apparatus is described. The apparatus may include a memory device including a first partition and a second partition and a controller in electronic communication with the memory device, where the controller is operable to generate, for a first virtual machine of the memory device, a first device-specific cryptographic key based on the first partition of the memory device, generate, for a second virtual machine of the memory device different from the first virtual machine, a second device-specific cryptographic key based on the second partition of the memory device, and authenticate the first virtual machine and the second virtual machine based on respective ones of the first device-specific cryptographic key or the second device-specific cryptographic key.

Some examples may further include receiving, from the first virtual machine, a command signed with a first signature associated with the first virtual machine, verify that the first signature may be valid based on an authentication procedure using the first device-specific cryptographic key, and verify that code of an operating system associated with the first virtual machine may be non-malicious based on verifying that the first signature may be valid.

Some examples may further include receiving, from the second virtual machine, a command signed with a second signature associated with the second virtual machine, verify that the second signature may be valid based on an authentication procedure using the second device-specific cryptographic key, and verify that code of an operating system associated with the second virtual machine may be non-malicious based on verifying that the second signature may be valid.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices described herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor described herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are signals), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that may be accessed by a general purpose or special purpose computer. By way of example, and not limitation, non-transitory computer-readable media may comprise RAM, ROM, electrically erasable programmable read-only memory (EEPROM), compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
generating a first device-specific cryptographic key based at least in part on a first partition of a memory device;
generating a second device-specific cryptographic key based at least in part on a second partition of the memory device;
assigning the first device-specific cryptographic key to a first virtual machine associated with the memory device;
assigning the second device-specific cryptographic key to a second virtual machine associated with the memory device and different from the first virtual machine; and
authenticating at least one of the first virtual machine or the second virtual machine based at least in part on respective ones of the first device-specific cryptographic key or the second device-specific cryptographic key, wherein authenticating at least one of the first virtual machine or the second virtual machine is based at least in part on verifying that a received cryptographic signature is valid.

2. The method of claim 1, wherein the first partition is associated with a first set of memory cells of the memory device and the second partition is associated with a second set of memory cells of the memory device different from the first set of memory cells.

3. The method of claim 1, further comprising:
generating a third device-specific cryptographic key based at least in part on the memory device; and
assigning the third device-specific cryptographic key to the memory device.

4. The method of claim 3, wherein the third device-specific cryptographic key is generated based at least in part on the first partition of the memory device and the second partition of the memory device.

5. The method of claim 3, wherein the third device-specific cryptographic key is generated based at least in part on a third partition of the memory device that is different from the first partition and the second partition.

6. The method of claim 5, wherein the third partition corresponds to all memory cells of the memory device.

7. The method of claim 1, wherein authenticating the first virtual machine comprises:
receiving, from the first virtual machine, a command signed with a first signature associated with the first virtual machine; and
verifying that the first signature is valid based at least in part on an authentication procedure using the first device-specific cryptographic key.

8. The method of claim 7, wherein authenticating the second virtual machine comprises:
receiving, from the second virtual machine, a second command signed with a second signature associated with the second virtual machine; and
verifying that the second signature is valid based at least in part on a second authentication procedure using the second device-specific cryptographic key.

9. A method, comprising:
generating a first device-specific cryptographic key based at least in part on a first partition of a memory device;
generating a second device-specific cryptographic key based at least in part on a second partition of the memory device;
assigning the first device-specific cryptographic key to a first virtual machine associated with the memory device;
assigning the second device-specific cryptographic key to a second virtual machine associated with the memory device and different from the first virtual machine; and
authenticating at least one of the first virtual machine or the second virtual machine based at least in part on respective ones of the first device-specific cryptographic key or the second device-specific cryptographic key, wherein authenticating the first virtual machine comprises:
receiving, from the first virtual machine, a command signed with a first signature associated with the first virtual machine;
verifying that the first signature is valid based at least in part on an authentication procedure using the first device-specific cryptographic key; and
verifying that code of an operating system associated with the first virtual machine is non-malicious based at least in part on the first signature, wherein authenticating the first virtual machine is further based at least in part on verifying that the code of the operating system is non-malicious.

10. A method, comprising:
generating a first device-specific cryptographic key based at least in part on a first partition of a memory device;
generating a second device-specific cryptographic key based at least in part on a second partition of the memory device;
assigning the first device-specific cryptographic key to a first virtual machine associated with the memory device;
assigning the second device-specific cryptographic key to a second virtual machine associated with the memory device and different from the first virtual machine;
authenticating at least one of the first virtual machine or the second virtual machine based at least in part on respective ones of the first device-specific cryptographic key or the second device-specific cryptographic key, wherein authenticating the second virtual machine comprises:
receiving, from the first virtual machine, a command signed with a first signature associated with the first virtual machine;
verifying that the first signature is valid based at least in part on an authentication procedure using the first device-specific cryptographic key;
receiving, from the second virtual machine, a second command signed with a second signature associated with the second virtual machine; and
verifying that the second signature is valid based at least in part on a second authentication procedure using the second device-specific cryptographic key; and
verifying that code of an operating system associated with the second virtual machine is non-malicious based at least in part on the second signature, wherein authenticating the second virtual machine is further based at least in part on verifying that the code of the operating system is non-malicious.

11. A method, comprising:
receiving a first cryptographic key from a first virtual machine associated with a memory device;
receiving a second cryptographic key from a second virtual machine associated with the memory device;
performing a first authentication procedure for the first virtual machine based at least in part on validating the first cryptographic key by the memory device, verifying that the received first cryptographic signature is valid, or both; and
performing a second authentication procedure for the second virtual machine based at least in part on validating the second cryptographic key by the memory device.

12. The method of claim 11, wherein:
the first cryptographic key is specific to a first partition of memory cells of the memory device; and
the second cryptographic key is specific to a second partition of memory cells of the memory device different than the first partition of memory cells.

13. A method comprising:
receiving a first cryptographic key from a first virtual machine associated with a memory device;
receiving a second cryptographic key from a second virtual machine associated with the memory device;
verifying that code of an operating system associated with the first virtual machine is non-malicious based at least in part on the first cryptographic key;
performing a first authentication procedure for the first virtual machine based at least in part on validating the first cryptographic key by the memory device, wherein performing the first authentication procedure is based at least in part on verifying that the code of the operating system is non-malicious; and
performing a second authentication procedure for the second virtual machine based at least in part on validating the second cryptographic key by the memory device.

14. The method of claim 13, further comprising:
generating a hash of the code of the operating system associated with the first virtual machine, wherein verifying that the code is non-malicious is based at least in part on generating the hash of the code.

15. The method of claim 13, further comprising:
verifying that the received first cryptographic signature is valid, and wherein performing the first authentication procedure is further based at least in part on verifying that the received first cryptographic signature is valid.

16. The method of claim 13, further comprising:
verifying that code of a second operating system associated with the second virtual machine is non-malicious based at least in part on the second cryptographic key, wherein performing the second authentication procedure is based at least in part on verifying that the code of the second operating system is non-malicious.

17. The method of claim 16, further comprising:
verifying that the received second cryptographic signature is valid, and wherein performing the first authentication procedure is further based at least in part on verifying that the received second cryptographic signature is valid.

18. An apparatus comprising:
a memory device comprising a first partition and a second partition; and
a controller in electronic communication with the memory device, wherein the controller is operable to:
generate, for a first virtual machine of the memory device, a first device-specific cryptographic key based at least in part on the first partition of the memory device;
generate, for a second virtual machine of the memory device different from the first virtual machine, a second device-specific cryptographic key based at least in part on the second partition of the memory device; and
authenticate the first virtual machine and the second virtual machine based at least in part on respective ones of the first device-specific cryptographic key or the second device-specific cryptographic key, wherein authenticating at least one of the first virtual machine or the second virtual machine is based at least in part on verifying that a received cryptographic signature is valid.

19. An apparatus comprising:
a memory device comprising a first partition and a second partition; and
a controller in electronic communication with the memory device, wherein the controller is operable to:
generate, for a first virtual machine of the memory device, a first device-specific cryptographic key based at least in part on the first partition of the memory device;
generate, for a second virtual machine of the memory device different from the first virtual machine, a second device-specific cryptographic key based at least in part on the second partition of the memory device;
authenticate the first virtual machine and the second virtual machine based at least in part on respective ones of the first device-specific cryptographic key or the second device-specific cryptographic key;
receive, from the first virtual machine, a command signed with a first signature associated with the first virtual machine;
verify that the first signature is valid based at least in part on an authentication procedure using the first device-specific cryptographic key; and
verify that code of an operating system associated with the first virtual machine is non-malicious based at least in part on verifying that the first signature is valid, wherein the first device-specific cryptographic key corresponds to a device in communications with the first virtual machine.

20. An apparatus of comprising:
a memory device comprising a first partition and a second partition; and
a controller in electronic communication with the memory device, wherein the controller is operable to:
generate, for a first virtual machine of the memory device, a first device-specific cryptographic key based at least in part on the first partition of the memory device;
generate, for a second virtual machine of the memory device different from the first virtual machine, a second device-specific cryptographic key based at least in part on the second partition of the memory device;
authenticate the first virtual machine and the second virtual machine based at least in part on respective ones of the first device-specific cryptographic key or the second device-specific cryptographic key;

receive, from the second virtual machine, a command signed with a second signature associated with the second virtual machine;

verify that the second signature is valid based at least in part on an authentication procedure using the second device-specific cryptographic key; and verify that code of an operating system associated with the second virtual machine is non-malicious based at least in part on verifying that the second signature is valid, wherein the second device-specific cryptographic key corresponds to a device in communications with the second virtual machine.

\* \* \* \* \*